US011735958B2

(12) United States Patent
Pihl

(10) Patent No.: US 11,735,958 B2
(45) Date of Patent: Aug. 22, 2023

(54) MULTIPHASE POWER TRANSFER IN INDUCTIVE COUPLERS

(71) Applicant: Halliburton Energy Services, Inc., Houston, TX (US)

(72) Inventor: Joachim Alexander Pihl, Sandefjord (NO)

(73) Assignee: Halliburton Energy Services, Inc., Houston, TX (US)

( * ) Notice: Subject to any disclaimer, the term of this patent is extended or adjusted under 35 U.S.C. 154(b) by 278 days.

(21) Appl. No.: 17/124,652

(22) Filed: Dec. 17, 2020

(65) Prior Publication Data

US 2022/0200343 A1    Jun. 23, 2022

(51) Int. Cl.
*H02J 50/12* (2016.01)
*E21B 47/12* (2012.01)
*H04B 5/00* (2006.01)

(52) U.S. Cl.
CPC .............. *H02J 50/12* (2016.02); *E21B 47/12* (2013.01); *H04B 5/0037* (2013.01); *H04B 5/0043* (2013.01); *H04B 5/0075* (2013.01)

(58) Field of Classification Search
CPC .......... H02J 50/005; H02J 50/12; H02J 50/40; E21B 47/12; E21B 17/028; E21B 17/0283; H04B 5/0037; H04B 5/0043; H04B 5/0075
See application file for complete search history.

(56) References Cited

U.S. PATENT DOCUMENTS

| 8,689,621 | B2 | 4/2014 | Godager |
| 9,646,763 | B2 | 5/2017 | Robertson et al. |
| 9,677,396 | B2 | 6/2017 | Godager |
| 10,400,578 | B2 | 9/2019 | Godager |
| 10,808,525 | B2 | 10/2020 | Hagen et al. |
| 2010/0270942 | A1 | 10/2010 | Hui et al. |
| 2013/0119927 | A1 | 5/2013 | Partovi |
| 2013/0120093 | A1* | 5/2013 | Deville ................... H01F 38/14 336/115 |

(Continued)

FOREIGN PATENT DOCUMENTS

| EP | 2591201 B1 | 10/2019 |
| WO | 2009045847 A2 | 4/2009 |

(Continued)

OTHER PUBLICATIONS

"DataSphere™ LinX® Monitoring System", Complete Solutions, Halliburton Energy Services, 2 pages, 2017.

(Continued)

*Primary Examiner* — Orlando Bousono
(74) *Attorney, Agent, or Firm* — Delizio, Peacock, Lewin & Guerra

(57) ABSTRACT

Systems and methods for multiphase power transfer in inductive couplers are provided. A system can include a first tubular having a first inductive coupler disposed on an outer surface thereof; a second tubular circumferentially disposed around the first tubular and forming an annulus therebetween; a second inductive coupler disposed on the second tubular; a first rectifier coupled to the second inductive coupler; a tank capacitor coupled to the first rectifier; and a load coupled in parallel with the tank capacitor.

20 Claims, 8 Drawing Sheets

(56) References Cited

U.S. PATENT DOCUMENTS

| | | |
|---|---|---|
| 2014/0083768 A1* | 3/2014 | Moriarty .............. E21B 17/028 |
| | | 175/40 |
| 2014/0265580 A1* | 9/2014 | Cooley .............. E21B 41/0085 |
| | | 290/1 A |
| 2014/0266210 A1 | 9/2014 | Godager |
| 2015/0054354 A1 | 2/2015 | Lemmens et al. |
| 2016/0053540 A9* | 2/2016 | Chitwood .............. E21B 36/04 |
| | | 175/57 |
| 2016/0326867 A1* | 11/2016 | Prammer ............ E21B 17/0285 |
| 2017/0248009 A1* | 8/2017 | Fripp .................. E21B 34/066 |
| 2019/0032423 A1* | 1/2019 | Sugiura .............. E21B 17/0283 |
| 2019/0360327 A1 | 11/2019 | Hagen et al. |
| 2020/0003048 A1* | 1/2020 | Orban .................... E21B 47/13 |
| 2020/0270989 A1 | 8/2020 | Hagen |
| 2021/0044191 A1* | 2/2021 | Hunstable ................ H02K 1/20 |
| 2021/0143788 A1* | 5/2021 | Crane .................... H01B 7/08 |

FOREIGN PATENT DOCUMENTS

| | | |
|---|---|---|
| WO | 2020005259 A1 | 1/2020 |
| WO | 2020018107 A1 | 1/2020 |
| WO | 2020050815 A1 | 3/2020 |

OTHER PUBLICATIONS

PCT Application No. PCT/US2020/065862, International Search Report, dated Sep. 3, 2021, 5 pages.
PCT Application No. PCT/US2020/065862, Written Opinion, dated Sep. 3, 2021, 5 pages.

* cited by examiner

MULTIPHASE POWER TRANSFER IN INDUCTIVE COUPLERS

TECHNICAL FIELD

The disclosure generally relates to the field of earth or rock drilling and more particularly to transmitting measuring-signals or control signals from the well to the surface, or from the surface to the well, using inductive coupling.

BACKGROUND

Transferring power and communications for instrumentation and actuators between the upper and lower completions, and for multilateral wells, requires some kind of connection. Mechanical (e.g., "wet mate") connections can prove troublesome, mainly because of the well environment. Electromagnetic couplers promise to solve this reliability problem, but the cost can be efficiency. Particularly if a lower completion is to include actuators, coupler efficiency is important. For use with multilateral wells or other well designs with multiple connections, efficiency is important, even for low-power instrumentation designs.

BRIEF DESCRIPTION OF THE DRAWINGS

Embodiments of the disclosure may be better understood by referencing the accompanying drawings.

DESCRIPTION

The description that follows includes example systems, methods, and techniques that embody examples of the disclosure. However, it is understood that this disclosure may be practiced without these specific details. For instance, this disclosure refers to one or more inductive coupling systems for well completions in illustrative examples. Embodiments of this disclosure can be also applied to any set of concentric tubulars, e.g. those deployed in drilling or accessed via a tool suspended from a conveyance. In other instances, well-known instruction instances, protocols, structures, and techniques have not been shown in detail in order not to obfuscate the description.

Electromagnetic, e.g. inductive, couplers can be used to provide wireless transfer of power and/or communication between two or more tubulars. For example, inductive coupling can be used to provide connection between upper and lower completions and/or to multilateral wellbores. Environmental factors and the necessity of environmental shielding can affect transfer efficiency of inductive coupling. Multiphase power can be used to improve the efficiency of the inductive coupling, ideally to transfer sufficient power to power one or more downhole instruments, e.g. one or more downhole actuators. Further, one or more configurations can be used to allow for greater tolerance for axial misalignment. In one or more embodiments, the coupler unit can be rotationally symmetric, i.e. not requiring any clocking to engage correctly and, depending on configuration, providing a large axial positioning tolerance while still offering adequate power and signal transfer efficiency.

Figure 1:
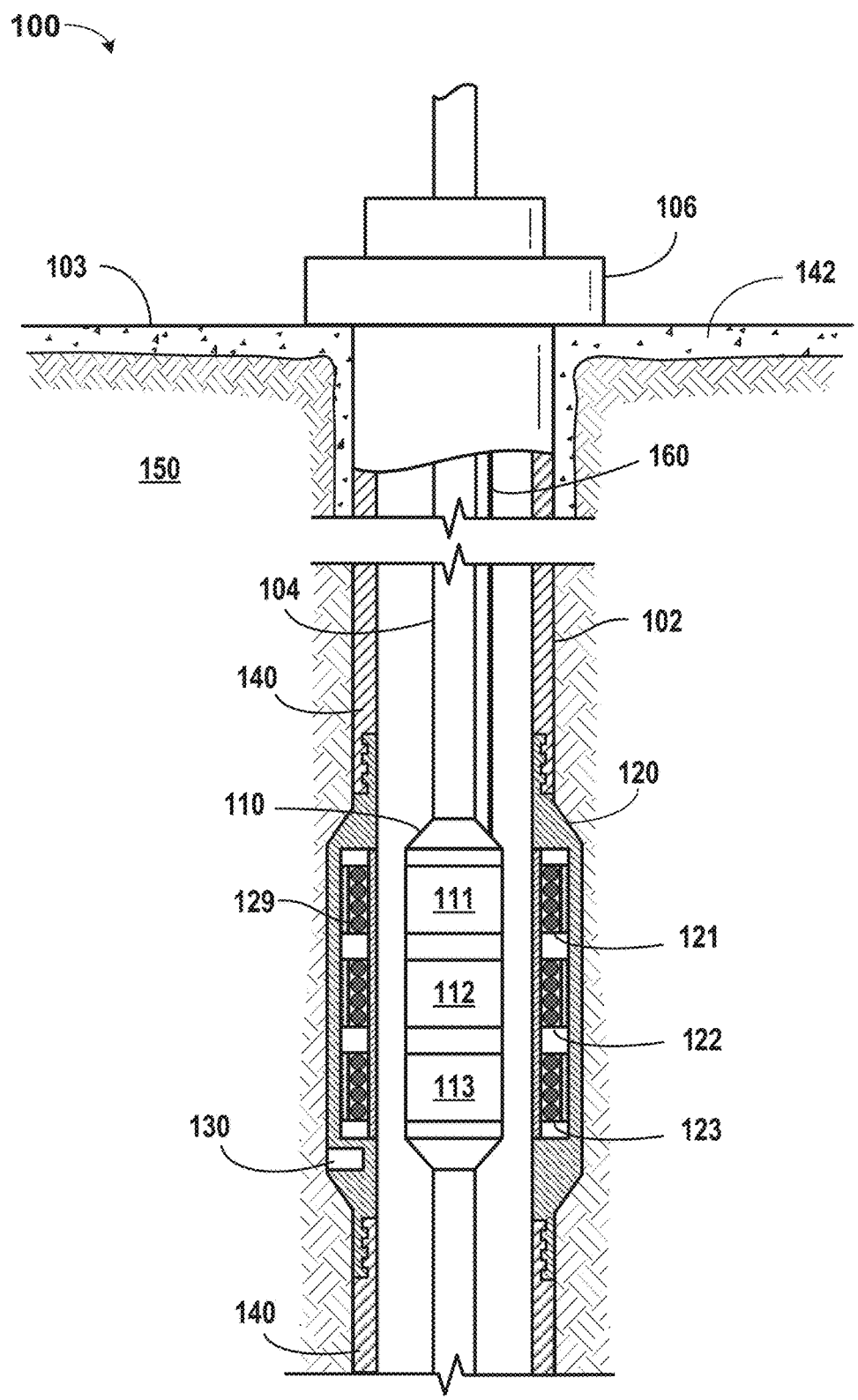
FIG. 1 depicts a partial cross-sectional view of a well completion, according to one or more embodiments.

FIG. 1 depicts a partial cross-sectional view of a well completion 100, according to one or more embodiments. The well completion 100 includes a wellbore 102 extending through a subterranean formation 150 from a wellhead 106 located at a surface 103. The wellbore 102 includes a casing string 140. The casing string 140 can be at least partially cemented into the subterranean formation, e.g. via one or one or more layers of cement 142. Although cement 142 is shown near the surface 103, in one or more embodiments cement can extend the length of the wellbore 102. Although the wellbore 102 is depicted as a single vertical wellbore, other implementations are possible. For example, the tubing string 104 can be used in a wellbore including one or more deviated or horizontal portions.

A casing-side antenna stack 120 is coupled to the casing string 140 and can include a casing-side instrument 130 and one or more casing-side antennas (three are shown: first casing-side antenna 121, second casing-side antenna 122, and third casing-side antenna 123). Note, although referred to as "casing-side" the antennas in the casing-side antenna stack 120 could be disposed on any tubular circumferentially disposed about another tubular, i.e. not just casing. For example, each casing-side antenna can be referred to as an "inductive coupler" due to the antennas' intended function to inductively couple to antennas disposed on another tubular.

In one or more embodiments, the casing-side instrument 130 can be coupled directly to the casing string 140 and communicatively coupled to the one or more casing-side antennas. Although only one casing-side instrument 130 is shown, multiple casing-side sensors can be used, e.g. disposed radially about the casing-side antenna stack 120 and/or axially disposed up or down the casing string 140. In one or more embodiments, multiple casing-side instrument 130 are used at various positions in a casing string. In one or more embodiments, one or more casing-side instruments 130 can be communicatively coupled to separate casing-side antenna stacks. In other embodiments, multiple casing-side instruments 130 can be communicatively coupled to a single casing-side antenna stack. In one or more embodiments, the casing-side instrument 130 includes one or more actuators, e.g. one or more valves, screens, or the like. In one or more embodiments, the casing-side instrument 130 includes any suitable sensor for measuring characteristics of the subterranean formation 150 or of the wellbore 102. For example, the casing-side instrument 130 can include one or more pressure sensors, temperature sensors, or the like. In some examples, the casing-side instrument 130 can include shielding for protection from electromagnetic fields generated by the antennas (tubing-side or casing-side). In one or more embodiments, although not shown, the casing-side instrument 130 is coupled to a power unit (e.g. one or more batteries) that powers the instrument and/or transmission of data back to the surface 103. In one or more embodiments, the power unit is powered via power transfer from the tubing-side antenna stack 110 to the casing-side antenna stack 120. The casing-side instrument 130 can be connected to downhole electronics and to another cable leading to other devices, e.g. further downhole.

A tubing string 104 is positioned in the wellbore 102, and a tubing-side antenna stack 110 is included in (or physically coupled to) the tubing string 104. A cable 160 (e.g. tubing encapsulated cable (TEC)) extends from the surface 103 of the wellbore 102 to the tubing-side antenna stack 110. The cable 160 can supply power and/or communication via one or more electrical signals to the tubing-side antenna stack 110. The cable 160 can communicatively couple the tubing-side antenna stack 110 to a computing device (not shown) for analyzing data measured by downhole sensors, e.g. when the casing-side instrument 130 is a sensor, or for actuating a downhole tool, e.g. when the casing-side instrument 130 is an actuator. Note, while the above describes the inner tubular communicating with the surface 103 via the cable 160, in one or more embodiments, the casing-side antenna stack 120 can communicate with the surface 103 directly via one or more cables. For example, a cable directly coupled to casing-side antenna stack 120 can communicatively couple the casing-side antenna stack 120 to the computing device to analyze data measured by downhole sensors disposed on the tubing string 104 or for actuating a downhole tool connecting to the tubing string 104.

As shown, the tubing-side antenna stack 110 has three tubing-side antennas, a first tubing-side antenna 111, a second tubing-side antenna 112, and a third tubing-side antenna 113. Note, although referred to as "tubing-side" the antennas in the tubing-side antenna stack 110 could be disposed on any tubular circumferentially disposed within another tubular, i.e. not just the tubing string 104. For example, similar to the casing-side antennas, each tubing-side antenna can be referred to as an "inductive coupler" due to the antennas' intended function to inductively couple to antennas disposed on another tubular, e.g. the a second tubular disposed about a first tubular. In additional or alternative examples, only one or two tubing-side antennas may be used. Using more than one tubing-side antenna can extend the alignment range of the communication system to maintain communication with the casing-side instrument 130 despite shifts in the position of the tubing string 104 within the wellbore 102 relative to the casing string 140. In one or more embodiments, more than one tubing-side antenna stack 110 can be included in, or positioned on, on the tubing string 104. As depicted, the tubing-side antenna stack 110 is positioned in the tubing string 104 to be aligned with the casing-side antenna stack 120. Alignment between the casing-side antenna stack 120 and the tubing-side antenna stack 110 can include one of the tubing-side antennas 111-113 being within range of one of the casing-side antennas 121-123 for communicating thereto, even if the one tubing-side antennas 111-113 is not physically aligned at the exact same axial position as the one casing-side antennas 121-123. In one or more embodiments, at least one power source and/or one or more phase drive is coupled to the tubing-side antennas 111-113.

The casing-side antennas 121-123 can each include conductive wire 129 for carrying current induced by an electromagnetic field that can be generated by the tubing-side antennas 111-113. In one or more embodiments, the conductive wire 129 for each of the casing-side antennas 121-123 is coiled in an opposite direction than conductive wire (not shown) in adjacent tubing-side antennas 111-113. In one or more embodiments, the conductive wire 129 for each of the casing-side antennas 121-123 is coiled in the same direction, and the conductive wire 129 is conductively coupled to a common antenna junction point such that adjacent casing-side antennas are conductively coupled in series and have opposite polarity such that the alternating current generated in each of the adjacent casing-side antennas travels in a different direction relative to the common antenna junction point. For example, current generated in the first casing-side antenna 121 may travel towards the common antenna junction point in response to an electromagnetic field, and current generated on a second casing-side antenna 122 that is adjacent to the first casing-side antenna 121 can travel away from the common antennas junction point in response to the electromagnetic field. Although the casing-side antennas 121-123 are shown as part of the casing-side antenna stack 120, in one or more embodiments the casing-side antennas can be wrapped around the casing string 140, e.g. between the casing string 140 and the subterranean formation 150 or between the casing string 140 and another casing string.

The tubing string 104 can move in any direction in response to changes in pressure, temperature, or fluid flowing through the tubing string 104. For example, the tubing string 104 can respond to a change in temperature by shifting towards the surface 103 or away from the surface 103 to another position.

Figure 2:
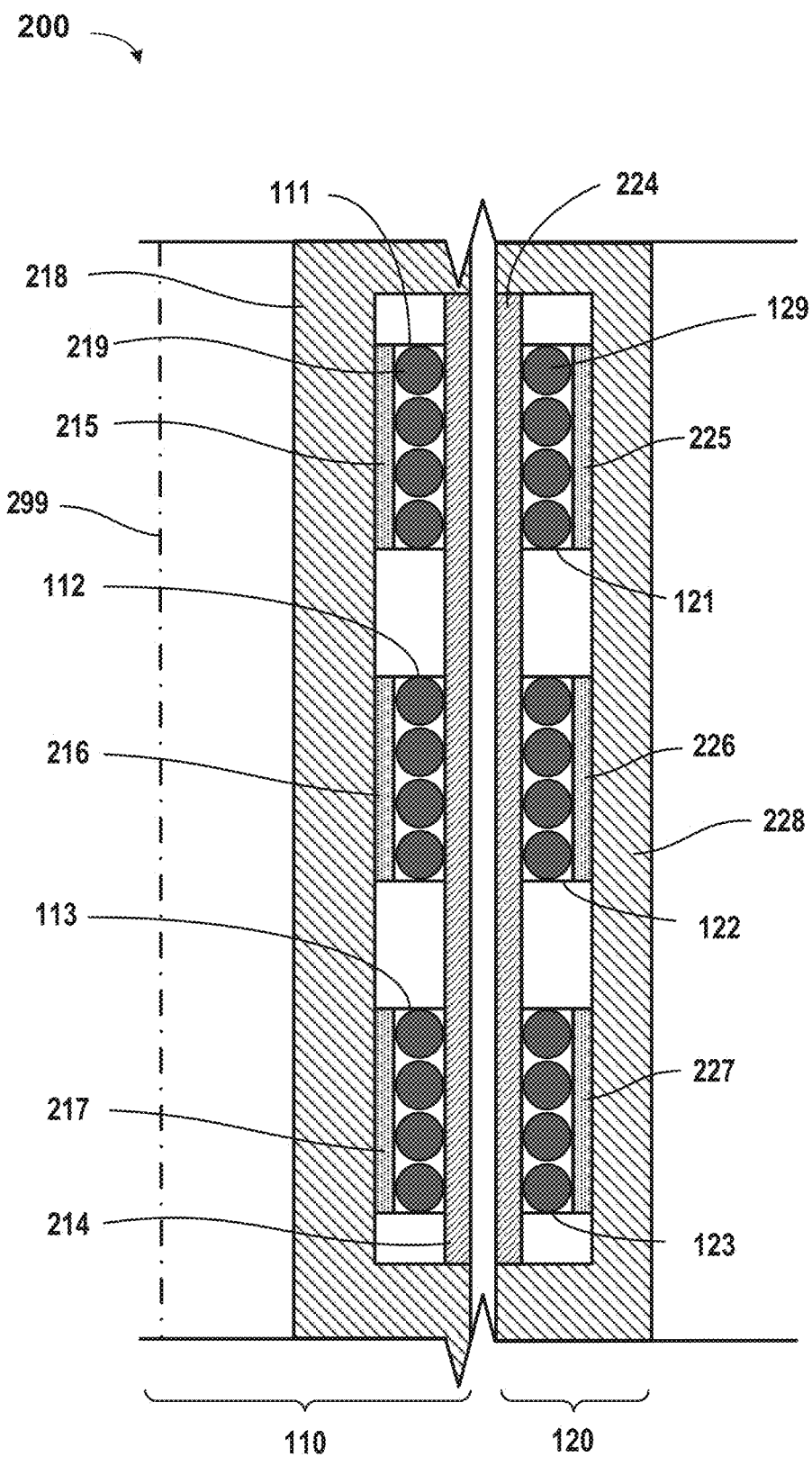
FIG. 2 depicts a cross-sectional view of a tubing-side antenna stack and a casing-side antenna stack, according to one or more embodiments.

FIG. 2 depicts a zoomed-in cross-sectional view of the tubing-side antenna stack 110 and the casing-side antenna stack 120, according to one or more embodiments. As depicted, the tubing-side antenna stack 110 is disposed close to the casing-side antenna stack 120, with a gap therebetween.

The casing-side antenna stack 120 is shown with three casing-side antennas: the first casing-side antenna 121, the second casing-side antenna 122, and the third casing-side antenna 123 disposed in a casing-side housing 228. The casing-side housing 228 can be a tubular with one or more portions hollowed out to receive the one or more casing-side antennas. Each antenna includes windings of conductive wire 129. The conductive wire 129 of each antenna can be wound around casing-side environmental shielding 224. The environmental shielding 224 can be a tubular with an outer diameter less than that formed by the wound conductive wire 129, i.e. forming a base for the conductive wire to be wound around. For each casing-side antenna 121-123, magnetic material can be disposed between the conductive wire 129 and the casing-side housing 228. For example, a first casing-side magnetic material 225 is disposed between the first casing-side antenna 121 and the casing-side housing 228, a second casing-side magnetic material 226 is disposed between the second casing-side antenna 122 and the casing-side housing 228, and a third casing-side magnetic material 227 is disposed between the third casing-side antenna 123 and the casing-side housing 228.

The tubing-side antenna stack 110 is shown with three tubing-side antennas: the first tubing-side antenna 111, the second tubing-side antenna 112, and the third tubing-side antenna 113 disposed about a mandrel 218. A center axis 299 of the tubing-side antenna stack 110 and of the mandrel 218 is depicted by a dashed line. The tubing-side antennas 111-113 include one or more windings of conductive wire 219. The windings of the tubing-side antennas 111-113 are wrapped about the mandrel 218 each having tubing-side magnetic material disposed between the conductive wire 219 and the mandrel 218. For example, a first tubing-side magnetic material 215 can be disposed between the first tubing-side antenna 111 and the mandrel 218, a second tubing-side magnetic material 216 can be disposed between the second tubing-side antenna 112 and the mandrel 218, and a third tubing-side magnetic material 217 can be disposed between the third tubing-side antenna 113 and the mandrel 218.

Both the casing-side environmental shielding 224 and the tubing-side environmental shielding 214 can be an austenitic nickel-chromium-based alloy, e.g. an INCONEL® alloy. In one or more embodiments, the environmental shielding can be about 40 thou thick. The presence of environmental shielding is often necessary in a downhole environment to protect the coils from heat, pressure, and corrosion. In one or more embodiments, the environmental shielding can cause a transmission loss, i.e. a power loss, between the sets of antennas, e.g. between the casing-side antennas and the tubing-side antennas. For example, the environmental shielding can cause up to a 30% power loss (yet be very necessary to protect the antennas from environmental damage). In one or more embodiments, the environmental shielding could be a structural component, e.g. the tubing string 104 or the casing string 140 itself.

Figure 3A:
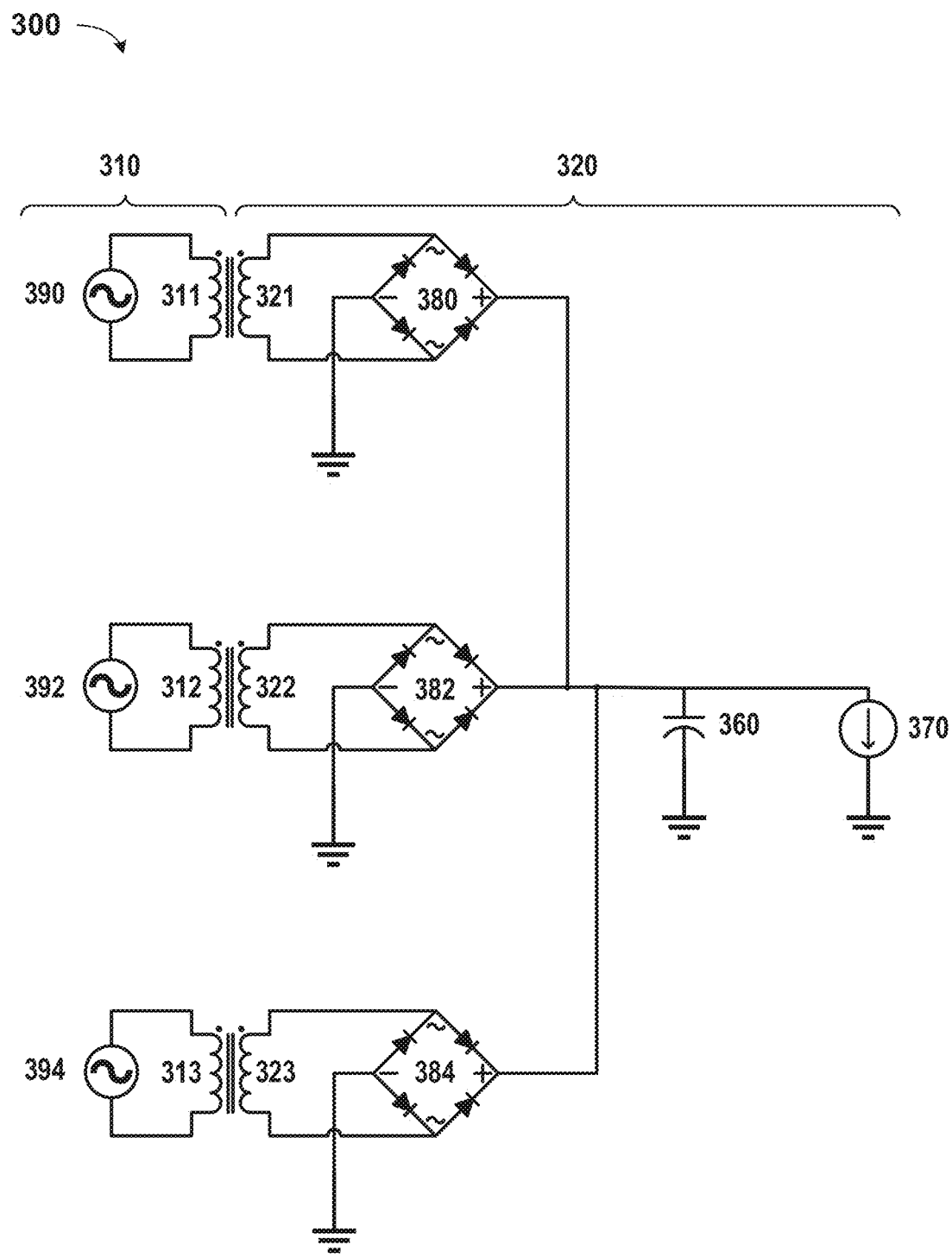
FIG. 3A depicts a schematic of a first inductive coupler system for multiphase power transfer, according to one or more embodiments.

FIG. 3A depicts a schematic of a first inductive coupler system 300 for multiphase power transfer, according to one or more embodiments. A first side 310 of the first inductive coupler system 300 represents the tubing-side antenna stack (e.g. tubing-side antenna stack 110) and a second side 320 of the first inductive coupler system 300 represents the casing-side antenna stack (e.g. casing-side antenna stack 120). The first side 310 includes three tubing-side antennas: a first tubing-side antenna 311, a second tubing-side antenna 312, and a third tubing-side antenna 313. The first tubing-side antenna 311 is powered, i.e. driven, by a first phase drive 390, the second tubing-side antenna 312 is driven by a second phase drive 392, and the third tubing-side antenna 313 is driven by a third phase drive 394.

The second side 320 includes three casing-side antennas: a first casing-side antenna 321, a second casing-side antenna 322, and a third casing-side antenna 323. Each tubing-side antenna is disposed to align with a respective casing-side antenna to be inductively coupled thereto when power is applied to the tubing-side antennas. For example, the first tubing-side antenna 311 can be aligned with the first casing-side antenna 321, the second tubing-side antenna 312 can be aligned with the second casing-side antenna 322, and the third tubing-side antenna 313 can be aligned with the third casing-side antenna 323. Note, exact alignment is not required for a tubing-side antenna to be inductively coupled to a casing-side antenna. However, the more aligned the greater can be the power transfer, i.e. the efficiency of the inductive coupling can increase with better alignment.

The second side 320 further includes a tank capacitor 360, a load 370, a first rectifier 380, a second rectifier 382, and a third rectifier 384. The first rectifier 380 is coupled to the first casing-side antenna 321 and is coupled in parallel to the tank capacitor 360 and the load 370. The second rectifier 382 is coupled to the second casing-side antenna 322 and is coupled in parallel to the tank capacitor 360 and the load 370. The third rectifier 384 is coupled to the third casing-side antenna 323 and is coupled in parallel to the tank capacitor 360 and the load 370.

Note, as mentioned above each antenna—whether casing-side or tubing-side—can also be described individually as inductive couplers. As such, the first inductive coupler system 300 can also be described as having first, third, and fifth inductive couplers (i.e. the first tubing-side antenna 311, the second tubing-side antenna 312, and the third tubing-side antenna 313, respectively) disposed on a first tubular (e.g. coupled to the tubing string 104 or coupled to the mandrel 281 of the tubing-side antenna stack), and having second, fourth, and sixth inductive couplers (i.e. first casing-side antenna 321, the second casing-side antenna 322, and the third casing-side antenna 323, respectively) disposed on a second tubular (e.g. coupled to the casing string 140, the casing-side environmental shielding 224, and/or the casing-side housing 228).

In one or more embodiments, the tank capacitor 360 reduces voltage ripple. Voltage ripple is the difference between the highest and lowest output voltage, and it is a periodic, repeating signal. The tank capacitor 360 slows down power increases, i.e. slowing voltage ramp, and also slows down power decline, i.e. slowing the voltage's rate of descent. In general, the higher the capacitance of the tank capacitor 360 the less voltage ripple. Reducing voltage ripple can improve power transfer of the first inductive coupler system 300. The load 370 can be an instrument, i.e. casing-side instrument 130, active electronics, or more cable, e.g. more TEC running further in the wellbore.

Figure 3B:
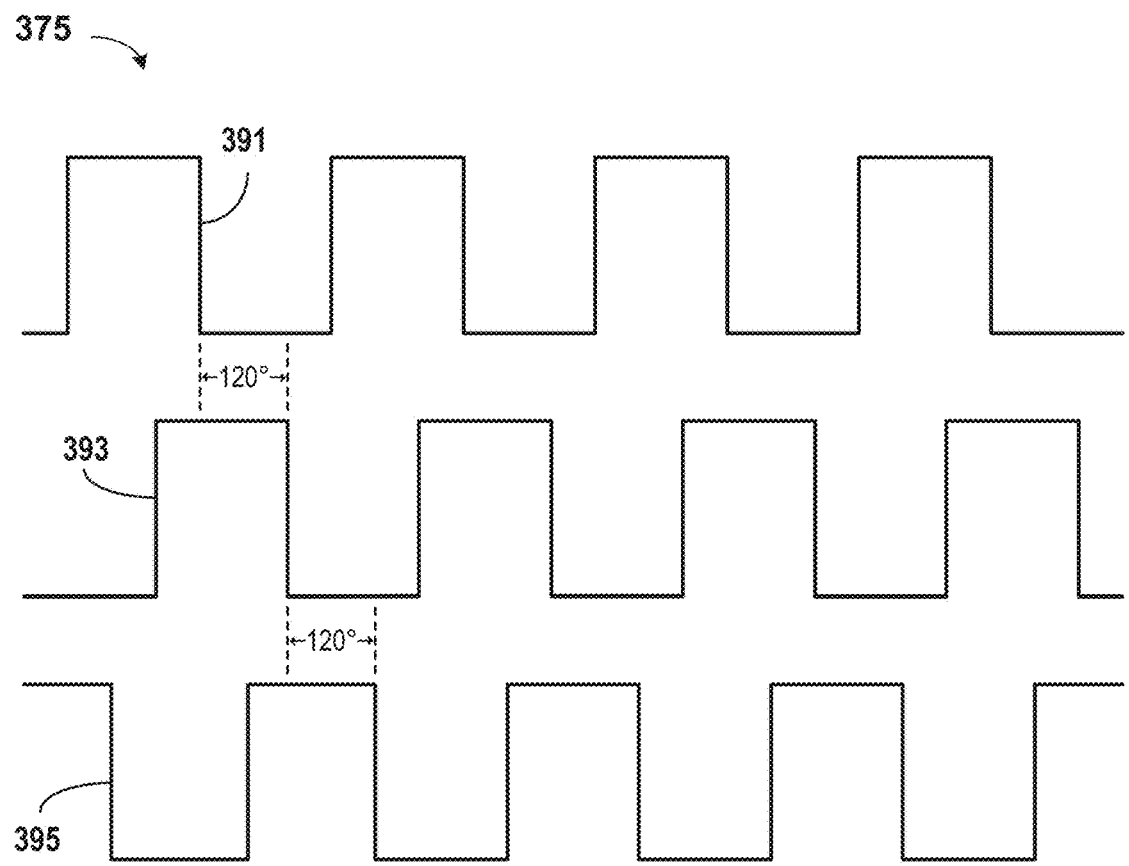
FIG. 3B depicts a timing diagram of the drive signals applied each transmitter coil of the first inductive coupler system, according to one or more embodiments.

FIG. 3B depicts a timing diagram 375 of drive signals applied each transmitter coil of the first inductive coupler system 300. When sending power using the first inductive coupler system 300, alternating current can be applied to each of the tubing-side antennas so each tubing-side antenna functions as a transmitter coil. For example, the first phase drive 390 can create a first drive signal 391, the second phase drive 392 can create a second drive signal 393, and the third phase drive 394 can create a third drive signal 395. In one or more embodiments, the first phase drive 390, the second phase drive 392, and the third phase drive 394 are powered from the surface via the same cable, e.g. via the same TEC. The phase drives can be push-pull or can run off positive and negative rails to provide current in both directions. The first drive signal 391 can be applied to the first tubing-side antenna 311, the second drive signal 393 can be applied to the second tubing-side antenna 312, and the third drive signal 395 can be applied to the third tubing-side antenna 313.

Each of the drive signals can be an alternating current, and, as shown, the drive signals can be implemented as square waves. The first drive signal 391, the second drive signal 393, and the third drive signal 395 can all be out of phase from each other. For example, the second drive signal 393 is out of phase with the first drive signal 391, and the third drive signal 395 is out of phase with the first drive signal 391 and the second drive signal 393. In one or more embodiments, the first phase drive 390 operates at a first phase angle, the second phase drive 392 operates at a second phase angle, and the third phase drive 394 operates at a third phase angle. For example, the first phase angle is offset 120° from the second phase angle, and the second phase angle is offset 120° from the third phase angle. Thus, the second drive signal 393 is 120° out of phase with the first drive signal 391, i.e. the second drive signal 393 is delayed to be 120° out of phase with the first drive signal 391. Likewise, the third drive signal 395 is 120° out of phase with the second drive signal 393, i.e. the third drive signal 395 is delayed to be 120° out of phase with the second drive signal 393.

By having three phases, voltage ripple is reduced and sometimes eliminated altogether. This can allow for a smaller capacitance on the tank capacitor 360, without loss of power and efficiency of the first inductive coupler system 300. Note, more than three phases can be used, i.e. more than three phase drives can be used, which may further reduce voltage ripple and thereby minimize the capacitance requirement of the tank capacitor 360.

In addition, less than three phases can be used. For example, a single phase system or a two phase system (e.g. a quadrature system) can be implemented.

Figure 4:
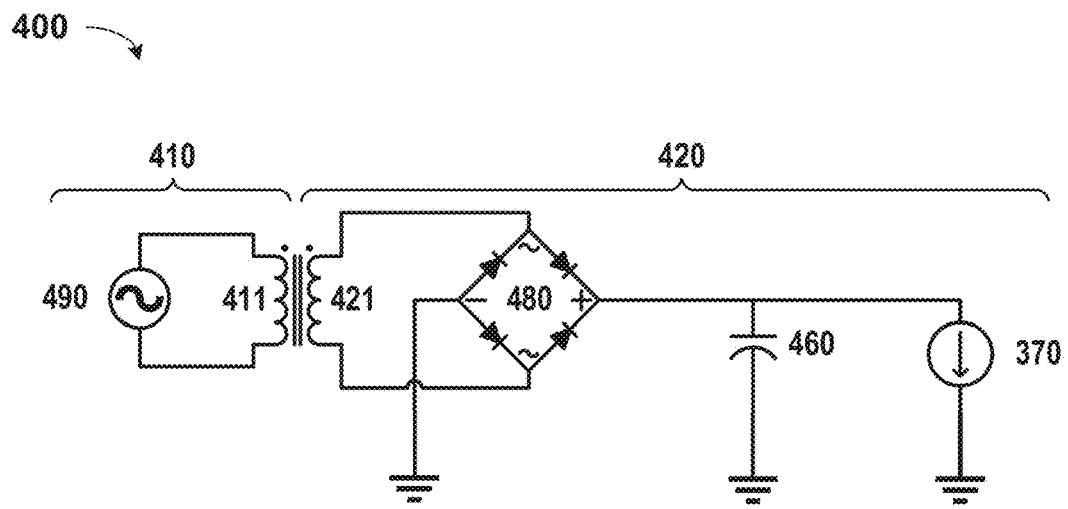
FIG. 4 depicts a schematic of a second inductive coupler system for single phase power transfer, according to one or more embodiments.

FIG. 4 depicts a schematic of a second inductive coupler system 400 for single phase power transfer, according to one or more embodiments. In one or more embodiments, a single phase drive can be used to reduce electronics used, especially one an outer tubing side, i.e. the casing side. The second inductive coupler system 400 has a single phase drive 490 coupled to a single tubing-side antenna 411, i.e. there is only a one inductive coupler on an inner tubing side 410. On an outer tubing side 420, e.g. the casing side, the second inductive coupler system 400 has a single casing-side antenna 421, i.e. a single inductive coupler on the outer tubing side 420. The single casing-side antenna 421 is coupled to a single rectifier 480 and coupled in parallel with a tank circuit, e.g. a tank capacitor 460, and the load 370. The single phase drive 490 can switch every 180° or be asymmetric. In one or more embodiments, depending on the state of charge in the tank circuit, the single rectifier 480 only conducts for a portion of the signal, e.g. for only 180°, causing the tank circuit to cover. Further, the single phase drive configuration of the second inductive coupler system 400 can lead to higher voltage ripple than in the first inductive coupler system 300. As such, the tank capacitor 460 has a higher capacitance than the tank capacitor 360.

Figure 5A:
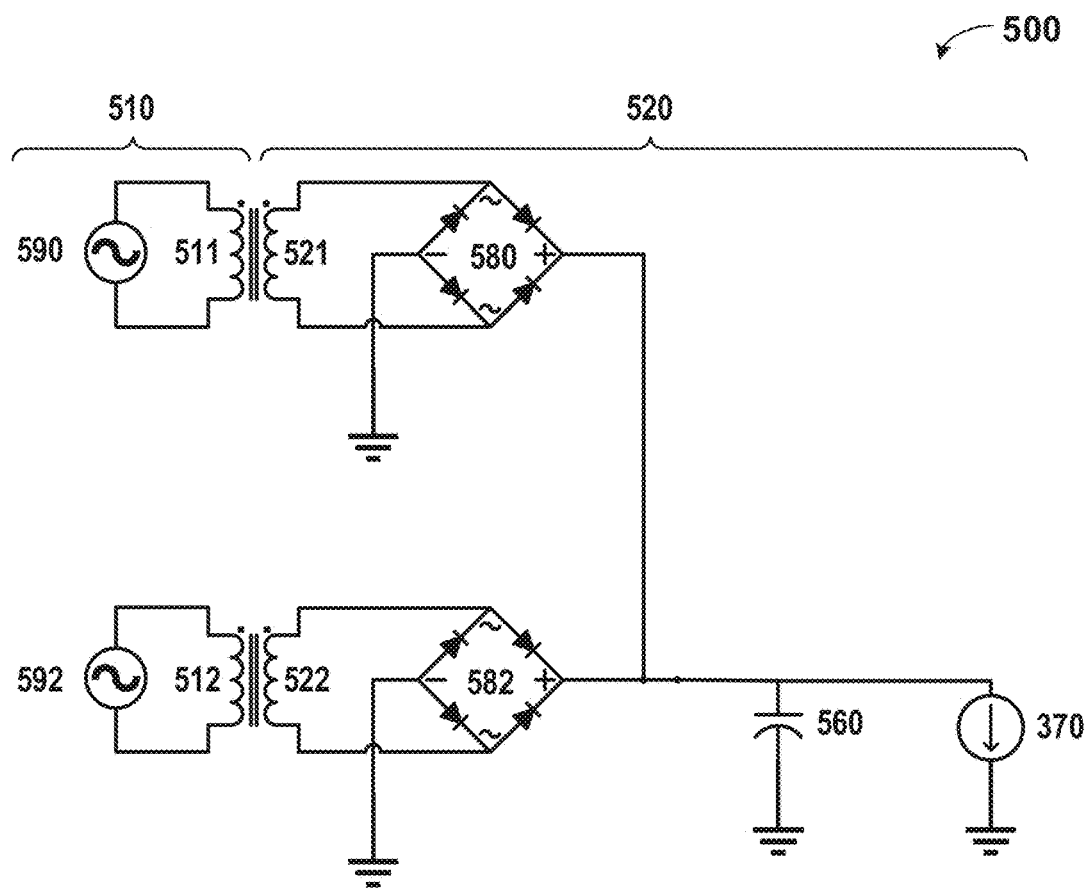
FIG. 5A depicts a schematic of a third inductive coupler system, according to one or more embodiments.

FIG. 5A depicts a schematic of a third inductive coupler system 500 having two phase drives, according to one or more embodiments. A first side 210 of the third inductive coupler system 500 represents the tubing-side antenna stack (e.g. tubing-side antenna stack 110) and a second side 520 of the third inductive coupler system 500 represents the casing-side antenna stack (e.g. casing-side antenna stack 120). The first side 510 includes two tubing-side antennas: a first tubing-side antenna 511 and a second tubing-side antenna 512. The first tubing-side antenna 511 is powered, i.e. driven, by a first phase drive 590 and the second tubing-side antenna 312 is driven by a second phase drive 592. The first phase drive 590 and the second phase drive 592 can output drive signals in quadrature.

The second side 520 includes two casing-side antennas: a first casing-side antenna 521 and a second casing-side antenna 322. Each tubing-side antenna is disposed to align with a respective casing-side antenna to be inductively coupled thereto when power is applied to the tubing-side antennas. For example, the first tubing-side antenna 511 can be aligned with the first casing-side antenna 521 and the second tubing-side antenna 512 can be aligned with the second casing-side antenna 522. Note, exact alignment is not required for a tubing-side antenna to be inductively coupled to a casing-side antenna. However, the more aligned the greater can be the power transfer, i.e. the efficiency of the inductive coupling can increase with better alignment. The second side 520 further includes a tank capacitor 560, the load 370, a first rectifier 580 and a second rectifier 582. The first rectifier 580 is coupled to the first casing-side antenna 521 and is coupled in parallel to the tank capacitor 560 and the load 370. The second rectifier 582 is coupled to the second casing-side antenna 522 and is coupled in parallel to the tank capacitor 560 and the load 370.

Note, as mentioned above each antenna—whether casing-side or tubing-side—can also be described individually as inductive couplers. As such, the third inductive coupler system 500 can also be described as having first and third inductive couplers (i.e. the first tubing-side antenna 511 and the second tubing-side antenna 512, respectively) disposed on a first tubular (e.g. coupled to the tubing string 104 or coupled to the mandrel 281 of the tubing-side antenna stack), and having second and fourth inductive couplers (i.e. first casing-side antenna 521 and the second casing-side antenna 522, respectively) disposed on a second tubular (e.g. coupled to the casing string 140, the casing-side environmental shielding 224, and/or the casing-side housing 228).

The third inductive coupler system 500 can have lower voltage ripple than the single phase drive is the second inductive coupler system 400, but possibly more voltage ripple than produced by the first inductive coupler system 300. As such, the tank capacitor 560 can have a lower capacitance than the tank capacitor 460 used in the second inductive coupler system 400 but a higher capacitance than the tank capacitor 360 used in the first inductive coupler system 300.

Figure 5B:
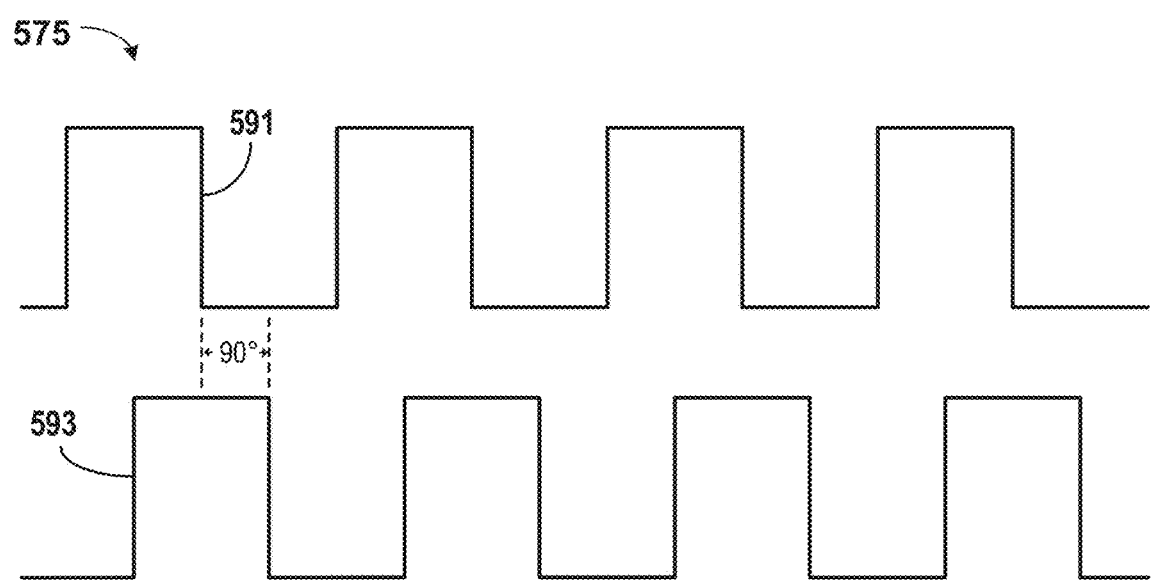
FIG. 5B depicts a timing diagram of the drive signals applied each transmitter coil of the third inductive coupler system, according to one or more embodiments.

FIG. 5B depicts a timing diagram 575 of the drive signals applied each transmitter coil of the third inductive coupler system 500, according to one or more embodiments. When sending power using the third inductive coupler system 500, alternating current can be applied to each of the tubing-side antennas so each tubing-side antenna functions as a transmitter coil. For example, the first phase drive 590 can create a first drive signal 591 and the second phase drive 592 can create a second drive signal 593. In one or more embodiments, the first phase drive 590 and the second phase drive 592 are powered from the surface via the same cable, e.g. via the same TEC. The phase drives can be push-pull or can run off positive and negative rails to provide current in both directions. The first drive signal 591 can be applied to the first tubing-side antenna 511 and the second drive signal 593 can be applied to the second tubing-side antenna 512.

Each of the drive signals can be an alternating current, and, as shown, the drive signals can be implemented as square waves. The first drive signal 591 and the second drive signal 593 can be out of phase from each other. In one or more embodiments, the first phase drive 590 and the second phase drive 592 operate in quadrature, i.e. such that the first drive signal 591 and the second drive signal 593 are orthogonal to one another. For example, the second drive signal 593 is shifted 90° the first drive signal 591, as depicted.

Figure 6:
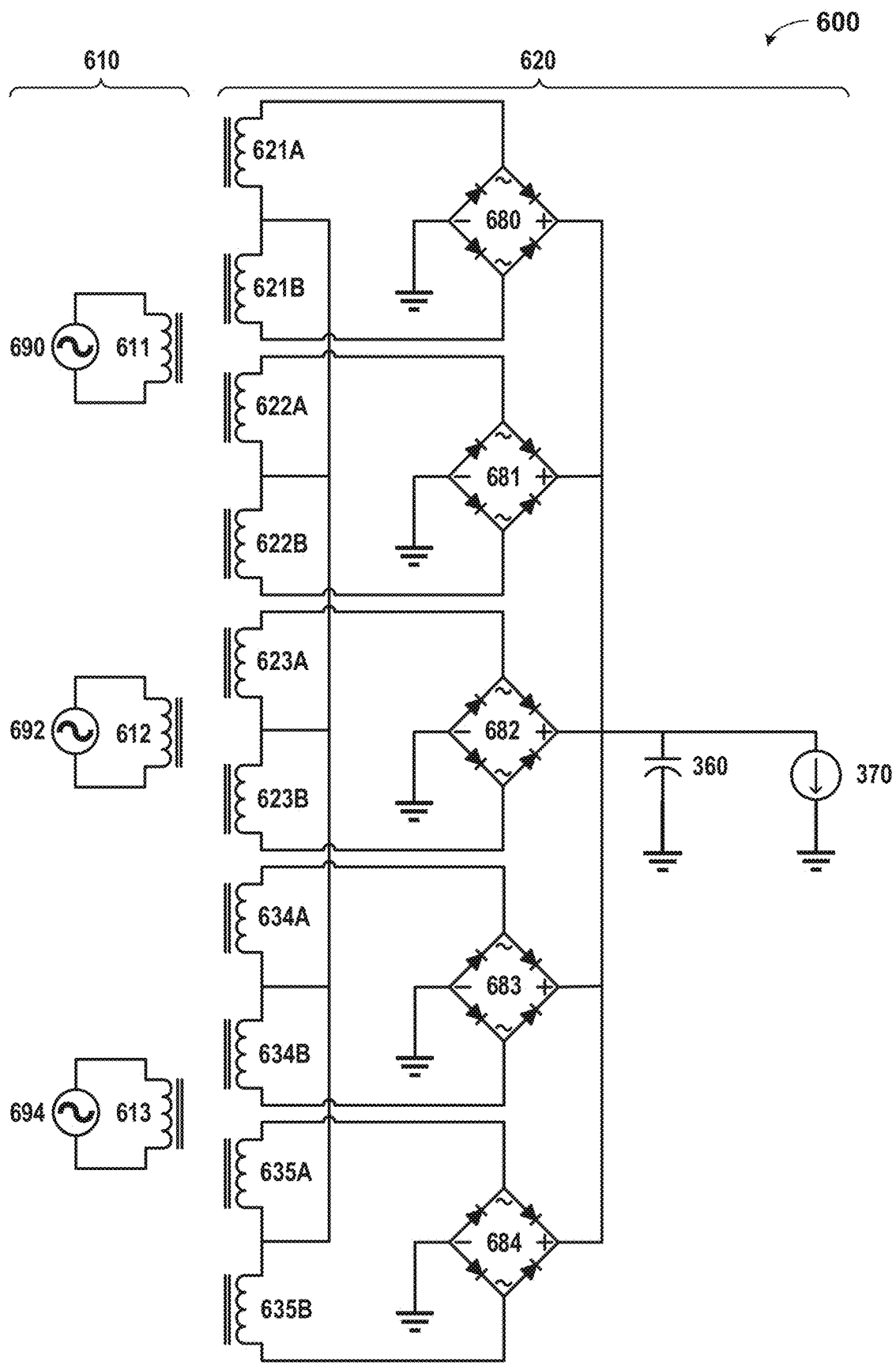
FIG. 6 depicts a schematic of a fourth inductive coupler system, according to one or more embodiments.

FIG. 6 depicts a schematic of a fourth inductive coupler system 600, according to one or more embodiments. The fourth inductive coupler system 600 shows two sides, a first side or tubing side 610, i.e. an inner tubular side (e.g. corresponding to the tubing-side antenna stack 110 in FIG. 1) and a second or casing side 620, i.e. an outer tubular side (e.g. corresponding to the casing-side antenna stack 120). Similar to the first inductive coupler system 300, the fourth inductive coupler system 600 includes three tubing-side antennas: a first tubing-side antenna 611, a second tubing-side antenna 612, and a third tubing-side antenna 613. The first tubing-side antenna 611 is powered, i.e. driven, by a first phase drive 690, the second tubing-side antenna 612 is driven by a second phase drive 692, and the third tubing-side antenna 613 is driven by a third phase drive 694.

The second side 620, however, differs from the second side 320 of the first inductive coupler system 300, as the second side 620 has a plurality of joined and/or grouped casing-side antennas. For example, five antenna groups are shown: first and second casing-side antennas 521A-521B, third and fourth casing-side antennas 522A-522B, fifth and sixth casing-side antennas 523A-523B, seventh and eighth casing-side antennas 534A-534B, and ninth and tenth casing-side antennas 535A-535B. Note, while five antenna groups are shown, more or less groups can be used. Each of the groups are joined at a junction between the antennas. In one or more embodiments, at least two casing-side antennas are joined by being center tapped. Further, each of the junctions (five junctions are depicted) are tied together. While shown grouped as pairs, more than two casing-side antennas can be linked or grouped together, e.g. being instead arranged in sets of three, four, or five, etc. In one or more embodiments, each of the casing-side antennas is half the length a tubing-side antenna. The tubing-side antennas 611-613 can be spaced equally apart. The distance between each of the tubing-side antennas 611-613 can be the length of a whole number of casing-side antennas. For example, the distance between each of the tubing-side antennas 611-613 can be equal to the length of two casing-side antennas, the length of three casing-side antennas (as depicted), the length of four casing-side antennas, or the like.

For each of the pairs, the ends of the antennas not tied to the junction are coupled to a rectifier. As shown, the first and second casing-side antennas 521A-521B are coupled to a first rectifier 680, the third and fourth casing-side antennas 522A-522B are coupled to a second rectifier 681, fifth and sixth casing-side antennas 523A-523B are coupled to a third rectifier 682, seventh and eighth casing-side antennas 534A-534B are coupled to a fourth rectifier 683, and ninth and tenth casing-side antennas 535A-535B are coupled to a fifth rectifier 684. Each of the rectifiers 680-684 are coupled to the tank capacitor 360 and the load 370.

The arrangement of the second side 620 can improve the coupling to the antennas, i.e. inductive couplers, in the first side 610. For example, the arrangement can improve the tolerance of the second side to axial misalignment of the antennas on the two sides. By connecting the casing-side antennas in the manner described above, the casing-side antennas can provide a continuous zone of connection with useful efficiency as long as the group of tubing-side antennas remains between the two furthest disposed casing-side antennas, i.e. between the first casing-side antenna 521A and the tenth casing-side antenna 535B. The region between the two furthest disposed casing-side antennas can be referred to as a "hitzone." In one or more embodiments, efficiency can vary by 10% to 15% over the length of the hitzone. This arrangement thus allows high efficiency even when axial shifts occur to one or more of the tubulars.

Figure 7A:
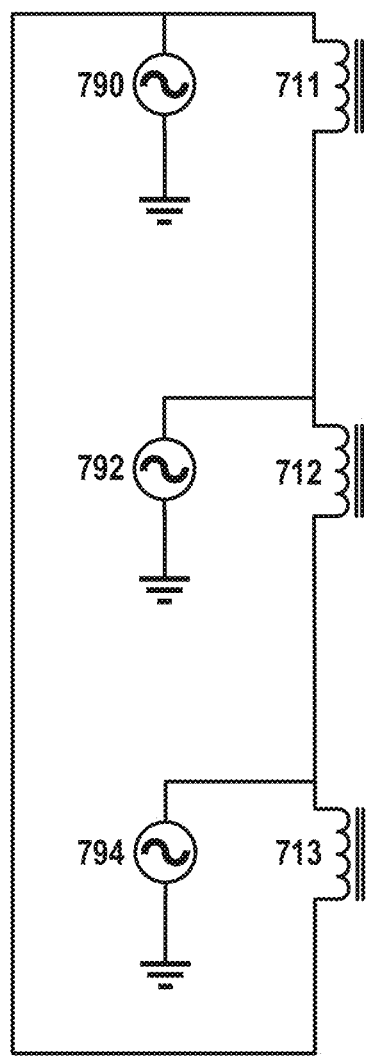
FIGS. 7A-7B depict tubing-side antennas connected in a delta configuration, according to one or more embodiments.
Figure 7B:
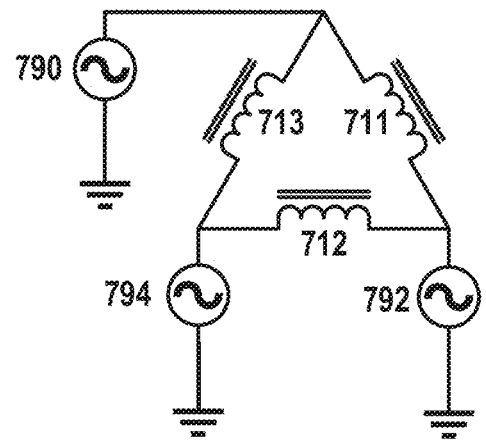

FIGS. 7A-7B depict tubing-side antennas connected in a delta configuration, according to one or more embodiments. FIG. 7A and FIG. 7B show electrically equivalent circuits. In FIG. 7B, tubing-side antennas 711-713, i.e. the inductive couplers of an inner tubular, are depicted in a "delta" shape. In FIG. 7A, the tubing-side antennas 711-713 are depicted wired in the same manner as in FIG. 7B, but with the tubing-side antennas 711-713 arranged axially as they would be in a physical implementation.

As seen, the negative side of the first tubing-side antenna 711 is connected to the positive side of the second tubing-side antenna 712, the negative side of the second tubing-side antenna 712 is connected to the positive side of the third tubing-side antenna 713, and the negative side of the third tubing-side antenna 713 is connected to the positive side of the first tubing-side antenna 711. Each of the tubing-side antennas 711-713 is still connected to a separate phase drive.

A first phase drive 790 is coupled to the first tubing-side antenna 711, a second phase drive 792 is coupled to the second tubing-side antenna 712, and a third phase drive 794 is coupled to the third tubing-side antenna 713. By using a three phase delta connection, as depicted, logic can be reduced in the circuit, e.g. three half-bridge drivers can be used. In one or more embodiments, while the delta configuration still uses three phases, the winding ratio of the antennas is compensated to reduce drive voltage by a factor of root of 3.

Figure 8:
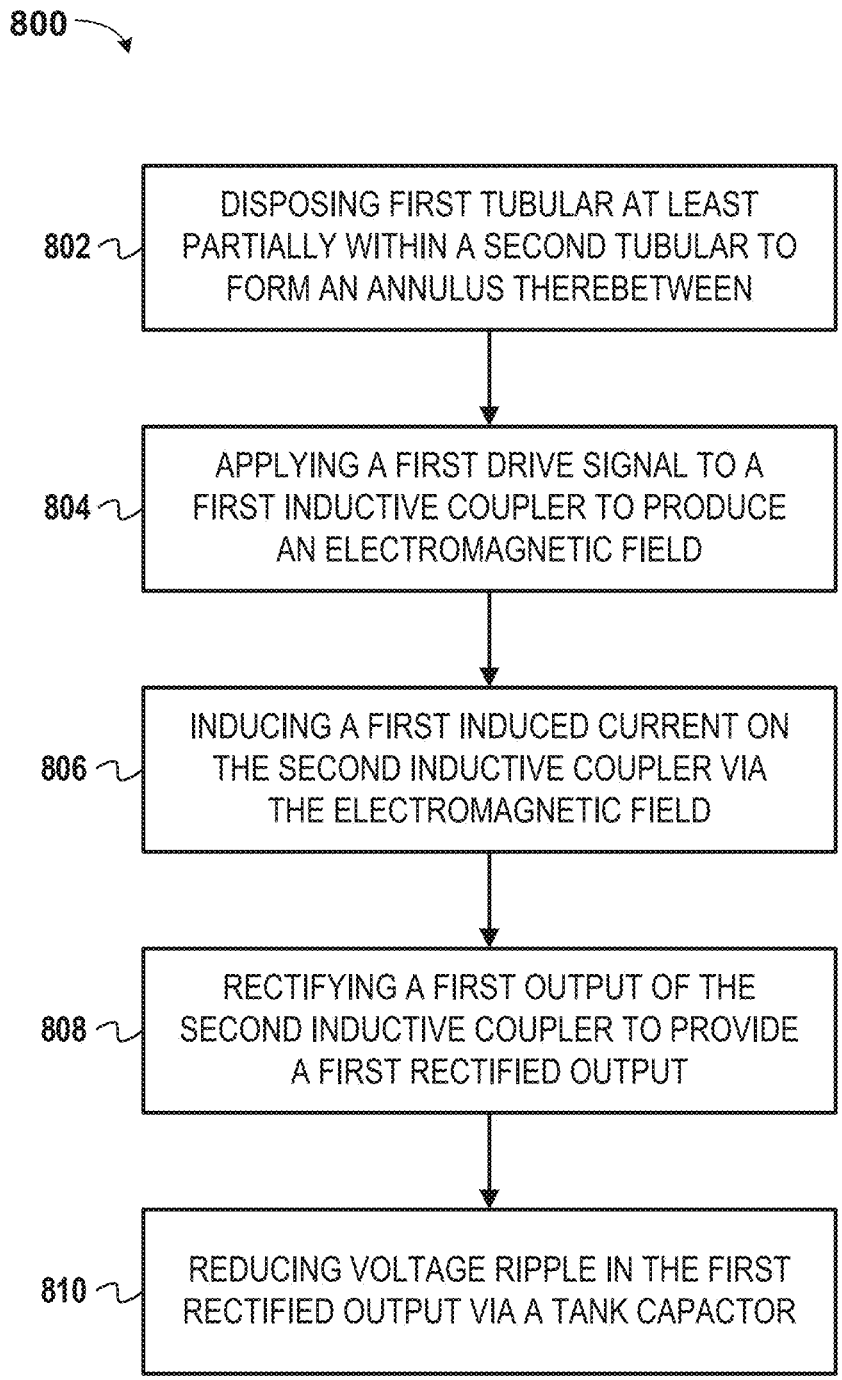
FIG. 8 depicts a flowchart of a method for transferring a signal from a first tubular to a second tubular using inductive coupling, according to one or more embodiments.

FIG. 8 depicts a flowchart of a method 800 for transferring a signal from a first tubular to a second tubular using inductive coupling, according to one or more embodiments. The method can be applied with any of the inductive coupler systems previously described and can be applied in the well completion 100 described in FIGS. 1 and 2. The signal transferred can be power and/or communication.

At 802, a first tubular (e.g. tubing string 104 or the mandrel 218) is at least partially disposed within a second tubular (e.g. one or more casing such as casing string 140 or the casing-side housing 228) to form an annulus therebetween, i.e. the second tubular is circumferentially disposed about the first tubular. Both the first and second tubular can be at least partially disposed in a wellbore, e.g. wellbore 102. The first tubular can have a first inductive coupler (e.g. the first tubing-side antenna 311, the single tubing-side antenna 411, the first tubing-side antenna 511, the first tubing-side antenna 611, or the first tubing-side antenna 711) disposed on an outer surface thereof, the outer surface facing the annulus. The second tubular can have a second inductive coupler (e.g. the first casing-side antenna 321, the single casing-side antenna 421, or first casing-side antenna 521, the first casing-side antenna 521A) disposed thereon, e.g. on an inner surface thereof, where the inner surface faces the annulus. In one or more embodiments, a first rectifier, e.g. a bridge rectifier, is coupled to the second inductive coupler and a tank capacitor is coupled to the first rectifier. A load can be coupled in parallel with the tank capacitor.

At 804, a first drive signal is applied to the first inductive coupler to produce an electromagnetic field. At 806, a first induced current is induced on the second inductive coupler via the electromagnetic field.

In one or more embodiments, a third inductive coupler (e.g. the second tubing-side antenna 312, the second tubing-side antenna 512, the second tubing-side antenna 612, or the second tubing-side antenna 712) and a fifth inductive coupler (e.g. the third tubing-side antenna 313, the third tubing-side antenna 613, or the third tubing-side antenna 713) are disposed on the outer surface of the first tubular. In one or more embodiments, multiple other inductive couplers are disposed on the second tubular. For example, a fourth inductive coupler (e.g. second casing-side antenna 322 or second casing-side antenna 522) and a sixth inductive coupler (e.g. third casing-side antenna 323) can be disposed on the second tubular, e.g. on the inner surface of the second tubular. In another example, a plurality of groups of inductive couplers (e.g. casing-side antennas 521A-535B) can be disposed on the second tubular.

In one or more embodiments, a second drive signal is applied to the third inductive coupler to induce a second induced current on the fourth inductive coupler, and a third drive signal is applied to the fifth inductive coupler to induce a third induced current on the fourth inductive coupler, wherein the second drive signal and the third drive signal have the same frequency as the first drive signal. In one or more embodiments, the second drive signal is out of phase with the first drive signal, and the third drive signal is out of phase with the first drive signal and the second drive signal. For example, the second drive signal can be 120° out of phase from the first drive signal, and the third drive signal can be 120° out of phase from the second drive signal.

At 808, a first output of the second inductive coupler, e.g. a voltage produced by the induced current, is rectified (e.g. via the first rectifier 380, the single rectifier 480, the first rectifier 580, or the first rectifier 680) to provide a first rectified output. In one or more embodiments, a second output of the fourth inductive coupler is rectified (e.g. via the second rectifier 382 or the second rectifier 582) to provide a second rectified output, and/or a third output of the sixth inductive coupler is rectified (e.g. via the third rectifier 383) to provide a third rectified output.

At 810, voltage ripple in the first rectified output is reduced via the tank capacitor. In one or more embodiments, the first rectified output, the second rectified output, and the third rectified output are combined to drive the load, and voltage ripple is reduced from the combined output.

The flowchart in FIG. 8 is annotated with a series of numbers/letters 802 to 810. These numbered blocks represent stages of operations. Although these stages are ordered for this example, the stages illustrate one example to aid in understanding this disclosure and should not be used to limit the claims. Subject matter falling within the scope of the claims can vary with respect to the order and some of the operations.

The flowchart is provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 808 and 810 can be performed in parallel or concurrently. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine-readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain or store a program for use by or in connection with an instruction execution system, apparatus, or device. A machine-readable storage medium is not a machine-readable signal medium.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing. Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine. The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

While the aspects of the disclosure are described with reference to various implementations and exploitations, it will be understood that these aspects are illustrative and that the scope of the claims is not limited to them. In general, techniques for inductive coupling as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Unless otherwise specified, use of the terms "connect," "engage," "couple," "attach," or any other like term describing an interaction between elements is not meant to limit the interaction to direct interaction between the elements and may also include indirect interaction between the elements described. For example, antennas may be coupled inductively without touching one another. Unless otherwise specified, use of the terms "up," "upper," "upward," "up-hole," "upstream," or other like terms shall be construed as generally from the formation toward the surface, e.g., toward wellhead 106 in FIG. 1, or toward the surface of a body of water; likewise, use of "down," "lower," "downward," "downhole," "downstream," or other like terms shall be construed as generally into the formation away from the surface or away from the surface of a body of water, regardless of the wellbore orientation. Use of any one or more of the foregoing terms shall not be construed as denoting positions along a perfectly vertical axis. Unless otherwise specified, use of the term "subterranean formation" shall be construed as encompassing both areas below exposed earth and areas below earth covered by water such as ocean or fresh water.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

EXAMPLE EMBODIMENTS

Numerous examples are provided herein to enhance understanding of the present disclosure. A specific set of example embodiments are provided as follows:

Example A: A system comprising: a first tubular having a first inductive coupler disposed on an outer surface thereof; a second tubular circumferentially disposed around the first tubular and forming an annulus therebetween; a second inductive coupler disposed on the second tubular; a first rectifier coupled to the second inductive coupler; a tank capacitor coupled to the first rectifier; and a load coupled in parallel with the tank capacitor.

The system in Example A can further comprise at least one of: (1) a third inductive coupler disposed on the outer surface of the first tubular, a fourth inductive coupler disposed on the second tubular, and a second rectifier coupled to the fourth inductive coupler and the tank capacitor; (2) a fifth inductive coupler disposed on the outer surface of the first tubular, a sixth inductive coupler disposed on the second tubular, and a third rectifier coupled to the sixth inductive coupler and the tank capacitor; (3) a seventh inductive coupler disposed on the second tubular, wherein the second inductive coupler and the seventh inductive coupler are joined at a first junction, an eighth inductive coupler disposed on the second tubular, wherein the fourth inductive coupler and the eighth inductive coupler are joined at a second junction, and a ninth inductive coupler disposed on the second tubular, wherein the sixth inductive coupler and the ninth inductive coupler are joined at a third junction, optionally, wherein (a) the first junction, the second junction, and the third junction are tied together; and/or (b) wherein the second inductive coupler and the seventh inductive coupler are coupled to the first rectifier, wherein the fourth inductive coupler and the eighth inductive coupler are coupled to a second rectifier, and wherein the sixth inductive coupler and the ninth inductive coupler are coupled to a third rectifier; (4) a first phase drive coupled to the first inductive coupler; (5) a second phase drive coupled to a third inductive coupler, wherein the third inductive coupler is disposed on the outer surface of the first tubular, and a third phase drive coupled to a fifth inductive coupler, wherein the fifth inductive coupler is disposed on the outer surface of the first tubular, optionally, wherein (w) the first phase drive operates at a first phase angle, the second phase drive operates at a second phase angle, and the third phase drive operates at a third phase angle; (x) the first phase angle is offset 120° from the second phase angle and the second phase angle is offset 120° from the third phase angle; (y) the first inductive coupler, the third inductive coupler, and the fifth inductive coupler are tied together in a delta configuration; and/or (z) the first phase drive is a single phase drive. In one or more embodiments of Example A, the load is at least one of a downhole instrument, active electronics, and a cable.

Example B: A method comprising: disposing a first tubular at least partially within a second tubular to form an annulus therebetween, wherein the first tubular has a first inductive coupler disposed on an outer surface thereof, the outer surface facing the annulus, wherein the second tubular has a second inductive coupler disposed thereon, wherein a first rectifier is coupled to the second inductive coupler, wherein a tank capacitor is coupled to the first rectifier, and wherein a load is coupled in parallel with the tank capacitor; applying a first drive signal to the first inductive coupler to produce an electromagnetic field; inducing a first induced current on the second inductive coupler via the electromagnetic field; rectifying a first output of the second inductive coupler to provide a first rectified output; and reducing voltage ripple in the first rectified output via the tank capacitor.

The method in Example B can further comprise transferring power from a phase drive to the load via the first inductive coupler and the second inductive coupler, wherein the phase drive is coupled to the first inductive coupler. In one or more embodiments of Example B, a third inductive coupler and a fifth inductive coupler are disposed on the outer surface of the first tubular, a fourth inductive coupler and a sixth inductive coupler are disposed on the second tubular, and the method in can further comprise: applying a second drive signal to the third inductive coupler to induce a second induced current on the fourth inductive coupler; applying a third drive signal to the fifth inductive coupler to induce a third induced current on the fourth inductive coupler, wherein the second drive signal and the third drive signal have the same frequency as the first drive signal; rectifying a second output of the fourth inductive coupler to provide a second rectified output; and rectifying a third output of the sixth inductive coupler to provide a third rectified output, optionally, wherein (a) the second drive signal is out of phase with the first drive signal and the third drive signal is out of phase with the first drive signal and the second drive signal; (b) the second drive signal is 120° out of phase from the first drive signal and the third drive signal is 120° out of phase from the second drive signal, and/or (c) the first rectified output, the second rectified output, and the third rectified output are combined to drive the load.

The invention claimed is:
1. A system comprising:
a first tubular having a first inductive coupler disposed on an outer surface thereof;
a second tubular circumferentially disposed around the first tubular and forming an annulus therebetween;

a second inductive coupler disposed on the second tubular;

a parallel inductive coupler disposed on the second tubular;

a first rectifier coupled in parallel to the second inductive coupler and the parallel inductive coupler;

a tank capacitor coupled to the first rectifier; and a load coupled in parallel with the tank capacitor.

2. The system of claim 1, further comprising:

a third inductive coupler disposed on the outer surface of the first tubular;

a fourth inductive coupler disposed on the second tubular; and a second rectifier coupled to the fourth inductive coupler and the tank capacitor.

3. The system of claim 2, further comprising:

a fifth inductive coupler disposed on the outer surface of the first tubular;

a sixth inductive coupler disposed on the second tubular; and a third rectifier coupled to the sixth inductive coupler and the tank capacitor.

4. The system of claim 3, further comprising:

wherein the second inductive coupler and the parallel inductive coupler are joined at a first junction;

a seventh inductive coupler disposed on the second tubular, wherein the fourth inductive coupler and the seventh inductive coupler are joined at a second junction; and an eighth inductive coupler disposed on the second tubular, wherein the sixth inductive coupler and the eighth inductive coupler are joined at a third junction.

5. The system of claim 4, wherein the first junction, the second junction, and the third junction are tied together.

6. The system of claim 4, wherein the fourth inductive coupler and the seventh inductive coupler are coupled to a second rectifier, and wherein the sixth inductive coupler and the eighth inductive coupler are coupled to a third rectifier.

7. The system of claim 1, wherein the load is at least one of a downhole instrument, active electronics, and a cable.

8. The system of claim 1, further comprising a first phase drive coupled to the first inductive coupler.

9. The system of claim 8, further comprising:

a second phase drive coupled to a third inductive coupler, wherein the third inductive coupler is disposed on the outer surface of the first tubular; and a third phase drive coupled to a fifth inductive coupler, wherein the fifth inductive coupler is disposed on the outer surface of the first tubular.

10. The system of claim 9, wherein the first phase drive operates at a first phase angle, wherein the second phase drive operates at a second phase angle, and wherein the third phase drive operates at a third phase angle.

11. The system of claim 10, wherein the first phase angle is offset 120° from the second phase angle, and wherein the second phase angle is offset 120° from the third phase angle.

12. The system of claim 9, wherein the first inductive coupler, the third inductive coupler, and the fifth inductive coupler are tied together in a delta configuration.

13. The system of claim 9, further comprising:

a fourth inductive coupler disposed on the second tubular;

a sixth inductive coupler disposed on the second tubular;

a second rectifier coupled to the fourth inductive coupler and the tank capacitor; and a third rectifier coupled to the sixth inductive coupler and the tank capacitor.

14. The system of claim 8, wherein the first phase drive is a single phase drive.

15. A method comprising:

disposing a first tubular at least partially within a second tubular to form an annulus therebetween, wherein the first tubular has a first inductive coupler disposed on an outer surface thereof, the outer surface facing the annulus, wherein the second tubular has a second inductive coupler and a parallel inductive coupler disposed thereon, wherein a first rectifier is coupled in parallel to the second inductive coupler and the parallel inductive coupler, wherein a tank capacitor is coupled to the first rectifier, and wherein a load is coupled in parallel with the tank capacitor;

applying a first drive signal to the first inductive coupler to produce an electromagnetic field;

inducing a first induced current on the second inductive coupler and the parallel inductive coupler via the electromagnetic field;

rectifying a first output of the second inductive coupler and a second output of the parallel inductive coupler to provide a first rectified output; and reducing voltage ripple in the first rectified output via the tank capacitor.

16. The method of claim 15, further comprising transferring power from a phase drive to the load via the first inductive coupler and the second inductive coupler and the parallel inductive coupler, wherein the phase drive is coupled to the first inductive coupler.

17. The method of claim 15, wherein a third inductive coupler and a fifth inductive coupler are disposed on the outer surface of the first tubular, wherein a fourth inductive coupler and a sixth inductive coupler are disposed on the second tubular, and the method further comprising:

applying a second drive signal to the third inductive coupler to induce a second induced current on the fourth inductive coupler;

applying a third drive signal to the fifth inductive coupler to induce a third induced current on the fourth inductive coupler, wherein the second drive signal and the third drive signal have the same frequency as the first drive signal;

rectifying a third output of the fourth inductive coupler to provide a second rectified output; and rectifying a third output of the sixth inductive coupler to provide a third rectified output.

18. The method of claim 17, wherein the second drive signal is out of phase with the first drive signal, and wherein the third drive signal is out of phase with the first drive signal and the second drive signal.

19. The method of claim 18, wherein the second drive signal is 120° out of phase from the first drive signal, and wherein the third drive signal is 120° out of phase from the second drive signal.

20. The method of claim 17, wherein the first rectified output, the second rectified output, and the third rectified output are combined to drive the load.

* * * * *